Feb. 20, 1968 R. J. HOLLY ET AL 3,369,371
GAS SAVER AND POLLUTION ELIMINATOR
Filed Oct. 5, 1966
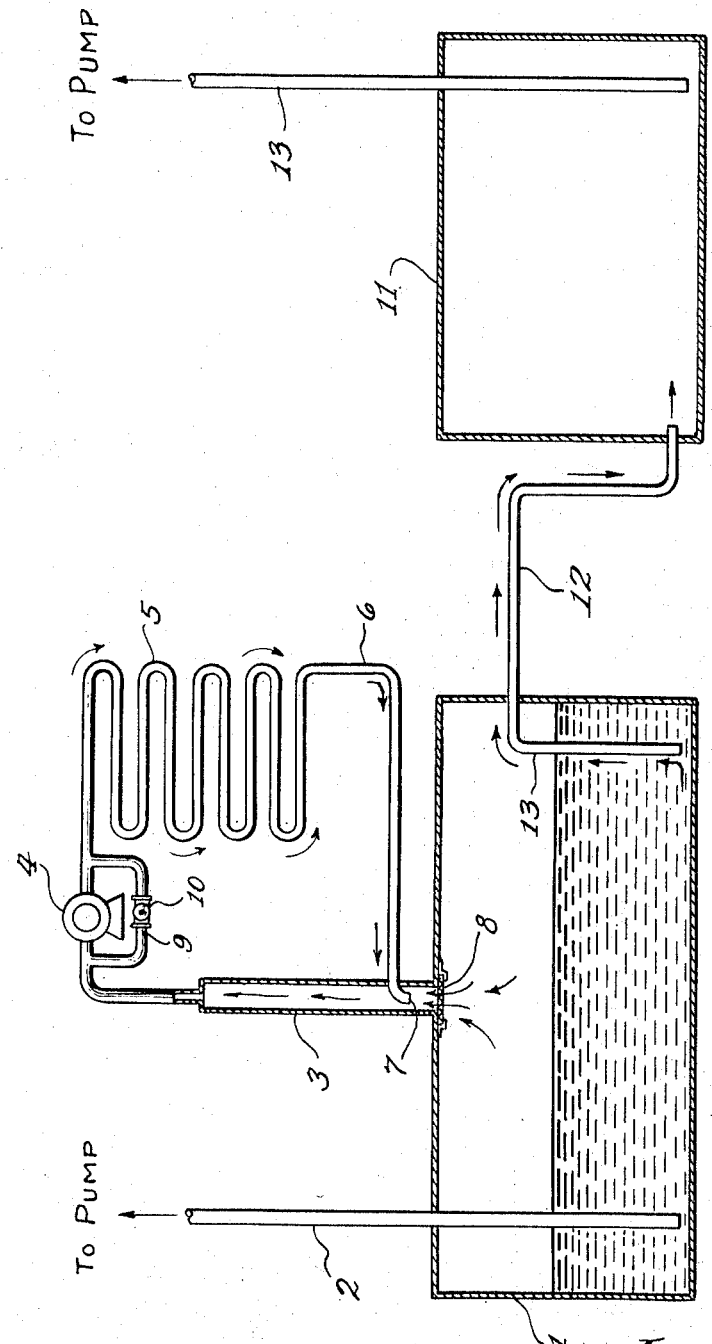
Inventors
Robert J. Holly
and Joseph T. Vinci
By Mann, Brown & McWilliams
Attys.

United States Patent Office 3,369,371
Patented Feb. 20, 1968

3,369,371
GAS SAVER AND POLLUTION ELIMINATOR
Robert J. Holly, 1641 W. Greenleaf Ave. 60626, and
Joseph T. Vinci, 3251 Bryn Mawr Ave. 60645, both
of Chicago, Ill.
Filed Oct. 5, 1966, Ser. No. 584,568
3 Claims. (Cl. 62—54)

ABSTRACT OF THE DISCLOSURE

Apparatus for preventing pollution of the atmosphere by means of vapors from gasoline and similar volatile hydrocarbons in which any vapors formed in the storage vessel are withdrawn through a vapor-tight system, compressed, condensed and returned to the storage tank. By-pass means are provided around the compressor and means are provided to withdraw liquid from the tank automatically upon the pressure therein reaching a predetermined level.

---

This invention relates to means for preventing pollution of the atmosphere and is more particularly concerned with apparatus for preventing pollution of air with light hydrocarbon vapors such as those which ordinarily escape from gasoline storage tanks.

It is common practice in the storage of gasoline and other volatile hydrocarbon liquids to provide a vent for escape of vapors from the tank to the atmosphere to avoid building up pressure in the tank. If too much pressure is built up there is danger of explosion occurring. With the rapid increase in population, governmental authorities are becoming concerned with atmospheric pollution and measures are being taken to require installation of devices to prevent or mitigate such pollution. In addition to polluting the atmosphere, such escaped vapors can be an explosion or fire hazard. Moreover, they represent an economic waste. Vaporization is caused not only by increase in temperature but also by agitation of the liquid produced by vibration of the ground from automobiles, trucks and possibly supersonic air vibrations produced by aircraft.

It is an object of this invention to provide means for mitigating pollution of the atmosphere. Another object of the invention is to provide means for mitigating pollution of the atmosphere with volatile hydrocarbon vapors escaping from gasoline and other storage tanks. A still further object of the invention is to provide means for recovering useful vapors from gasoline and other highly volatile material escaping from storage tanks.

Further objects of the invention will manifest themselves from the drawing, of which the single feature is a diagrammatic illustration of one form of apparatus conforming to our invention.

Referring to the drawing, the numeral 1 indicates a storage tank which may be a conventional cylindrical storage tank made of metal or plastic material such as those which are in use for underground storage of gasoline at service stations.

Extending from near the bottom of tank 1 is a withdrawal pipe or conduit 2 which is ordinarily connected to a gasoline dispensing portion mounted on a service station island. Connected to the top of the storage tank 1 is a vapor withdrawal conduit 3 which in turn is connected to a compressor 4, a cooling or condensing coil 5 and a return line 6. The conduit 3, compressor 4, condensing coil 5 and return line 6 form a closed circuit for withdrawing vapor from the tank 1 and returning the condensed vapor to the tank. Condensing coil 5 may be cooled by any suitable means such as by water, air or refrigerating medium. The condensed vapor is returned through line 6 to the outlet 7 into the lower part of conduit 3, a short distance above is member 8 which is preferably mounted across the bottom end of conduit 3. Member 8 may be a screen, foraminous plate or other element which affords intimate contact between the up-flowing vapor and down-flowing condensate. In this way a considerable portion of the escaping vapor is absorbed in the returning condensate, thereby reducing the volume of vapor which must be condensed.

The type of cooling means used to cool the coil 5 will depend on the atmospheric conditions. In the wintertime it may be sufficient to cool the coil by means of atmospheric air. Where the temperature of the air is moderate, that is, in the area of 60 to 70 degrees F., it may be sufficient to utilize cooling water. At high air temperatures, such as in the areas where the temperature is of the order of 90 degrees F. or higher and where the water temperature is correspondingly high, it may be necessary to use a refrigerant to cool the vapors sufficiently to condense them.

The apparatus is provided with a by-pass line 9 equipped with a valve 10 in order to permit the compressor 4 to be by-passed where conditions are such that the condensing coil can satisfactorily condense the vapors without first compressing them.

A second or auxiliary tank 11 is provided into which liquid gasoline or other volatile liquid can flow from tank 1 through conduit 12. A vertical leg 13 of conduit 12 extends upwardly to a point intermediate the top of tank 1 and a predetermined or desired liquid level in the tank. Thus, if the gas pressure of the storage tank 1 exceeds a predetermined amount it will cause the liquid to rise in the vertical leg 13 and flow into auxiliary tank 11, thereby preventing further rise in pressure in the tank. Means are provided for pumping fluid from auxiliary tank 11 through withdrawal line 13. The pump connected to line 13 can be controlled automatically to actuate it in the event the pressure in tank 11 exceeds a predetermined amount. The flow from wtihdrawal line 13 can be pumped to any desired point, or it may be returned if desired to storage tank 1, as, for example, by admitting it into withdrawal conduit 3 so that any liquid returns to tank 1 and any vapors pass upward for cooling and condensing.

By means of this invention, not only is pollution of air by vapors from a large number of automotive service stations prevented, but a large economic saving in gasoline is effected since no portion of the gasoline components is exhausted to the atmosphere.

Although the invention has been described in connection with undergorund storage tanks, it will be apparent that the invention is also applicable to above-ground storage tanks.

What is claimed is:

1. Apparatus for preventing pollution of air by means of hydrocarbon vapor escaping from a storage tank containing volatile liquid hydrocarbons, consisting of a storage tank, means for withdrawing vapor-free liquid from said tank, means for withdrawing vapor from said tank, a condenser, means connected to said condenser for returning condensed vapor to said tank, a compressor connected between said means for withdrawing vapor and said condenser, and a valved by-pass conduit connected across said compressor, said means, condenser, compressor and by-pass conduit being in vapor-tight connection in order to prevent escape of vapors to the atmosphere.

2. Apparatus in accordance with claim 1 in which said means for withdrawing liquid from said tank includes means for automatically transferring vapor-free liquid from said first-mentioned tank into a second tank when the pressure in said first-mentioned tank exceeds a predetermined amount.

3. Apparatus in accordance with claim 2 in which said means for automatically transferring vapor-free liquid includes a conduit extending upwardly from adjacent the bottom of said first-mentioned tank to a point intermediate the top of said tank and a predetermined liquid level therein.

References Cited

UNITED STATES PATENTS

| | | | |
|---|---|---|---|
| 1,968,504 | 7/1934 | Rufener et al. | 62—54 |
| 2,682,154 | 6/1954 | Wilkinson | 62—54 |
| 2,938,360 | 5/1960 | Christensen | 62—54 |
| 2,944,405 | 7/1960 | Basore et al. | 62—54 |
| 3,108,447 | 10/1963 | Maher et al. | 62—54 |
| 3,124,937 | 3/1964 | King | 62—54 |
| 3,246,480 | 4/1966 | Rigby | 62—54 |
| 3,318,104 | 5/1967 | Roszkowski | 62—54 |

LLOYD L. KING, *Primary Examiner.*